US009325249B2

(12) United States Patent
Bucheru

(10) Patent No.: US 9,325,249 B2
(45) Date of Patent: Apr. 26, 2016

(54) SINGLE STAGE BOOST-ASYMMETRIC LLC

(71) Applicant: Apple Inc., Cupertino, CA (US)

(72) Inventor: Bogdan T. Bucheru, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 308 days.

(21) Appl. No.: 13/802,311

(22) Filed: Mar. 13, 2013

(65) Prior Publication Data

US 2014/0268902 A1    Sep. 18, 2014

(51) Int. Cl.
| | |
|---|---|
| *H02M 3/335* | (2006.01) |
| *H02M 3/337* | (2006.01) |
| *H02M 1/42* | (2007.01) |
| *H02M 1/00* | (2006.01) |

(52) U.S. Cl.
CPC .......... *H02M 3/3372* (2013.01); *H02M 1/4258* (2013.01); *H02M 2001/0058* (2013.01); *Y02B 70/126* (2013.01); *Y02B 70/1433* (2013.01); *Y02B 70/1491* (2013.01)

(58) Field of Classification Search
CPC .............. H02M 3/3376; H02M 3/337; H02M 3/33592; H02M 3/33507; H02M 3/33569; H02M 3/3385; H02M 3/3372
USPC .............. 363/15–17, 20, 21.01–21.03, 21.12, 363/21.15, 21.16, 21.18, 34, 37, 39, 44, 48, 363/74, 76, 77, 80–82, 84, 89–91, 123, 363/125–127, 170–173; 323/259, 261, 282, 323/284–288
See application file for complete search history.

(56) References Cited

U.S. PATENT DOCUMENTS

| | | | |
|---|---|---|---|
| 5,159,541 A | | 10/1992 | Jain |
| 5,245,520 A | * | 9/1993 | Imbertson ...................... 363/17 |
| 5,757,626 A | | 5/1998 | Jovanovic et al. |
| 5,991,172 A | | 11/1999 | Jovanovic et al. |
| 6,950,319 B2 | | 9/2005 | Huber et al. |
| 6,987,676 B2 | | 1/2006 | Cheng et al. |
| 7,944,715 B2 | | 5/2011 | Zhang et al. |
| 8,014,176 B2 | * | 9/2011 | Melanson et al. ......... 363/21.02 |

(Continued)

OTHER PUBLICATIONS

Bucheru et al., "Increasing power density of adapters by using DC link chopper." IEEE 978-1-4577-1216, pp. 796-801 (Jun. 2012).
Freescale Semiconductor, Inc., "LLC resonant AC/DC switched mode power supply using the MC56F8013 and MC56F8257." (Oct. 12, 2012).

*Primary Examiner* — Gary L Laxton
*Assistant Examiner* — Kevin H Sprenger
(74) *Attorney, Agent, or Firm* — Downey Brand LLP

(57) ABSTRACT

An AC/DC power converter utilizing a single stage boost-asymmetric LLC topology is disclosed. The converter uses a combined pulse width modulation (PWM) and frequency modulation (FM) to achieve dual control for a single main magnetic element (transformer). The transformer provides an output voltage regulation throughout the primary-secondary isolation operating in resonant mode (LLC) by means of frequency modulation, while at the same time its magnetizing inductance is conditioning the input current and providing a boosted high voltage for energy storage purpose by means of duty cycle control. A single pair of complementary primary switches is used to drive the primary winding of the transformer in order to achieve both voltage regulation and power conditioning. The secondary side capacitors and the resonant inductor, which may be either integrated into the transformer or external to the transformer, achieve the resonant function of the transformer.

20 Claims, 9 Drawing Sheets

Single Stage Boost-Asymmetric LLC AC/DC Converter

(56) References Cited

U.S. PATENT DOCUMENTS

| | | |
|---|---|---|
| 8,213,190 B2 | 7/2012 | Li |
| 8,929,103 B2 * | 1/2015 | Brkovic .................. H01F 27/38 363/21.14 |
| 2009/0290384 A1 * | 11/2009 | Jungreis ........................... 363/17 |
| 2009/0316443 A1 | 12/2009 | Coccia et al. |
| 2011/0242854 A1 * | 10/2011 | Minami et al. .................. 363/17 |
| 2011/0299301 A1 | 12/2011 | Huang |
| 2012/0262954 A1 * | 10/2012 | Duvnjak ..................... 363/21.02 |
| 2012/0268969 A1 * | 10/2012 | Cuk ........................ H02M 7/48 363/17 |
| 2012/0281436 A1 * | 11/2012 | Cuk .................. H02M 3/33569 363/21.03 |

* cited by examiner

AC power input

Rectified DC power output where D allowed to be equal to 1

Rectified DC power output where D not allowed to be equal to 1

SINGLE STAGE BOOST-ASYMMETRIC LLC

FIELD OF THE DESCRIBED EMBODIMENTS

The described embodiments relate generally to a universal input AC/DC (alternating current/direct current) converter and more particularly to a single stage isolated AC/DC converter using LLC resonance, where pulse width modulation and frequency modulation are used simultaneous to regulated a DC output voltage.

BACKGROUND

AC/DC switching power supplies, such as laptop computer chargers, must conform to certain standards. One of these standards is the power factor (PF), which requires conditioning of the input current from the external AC outlet. The standard AC outlet is typically designed to handle 10 A current at 110 V, so at 1.1 kW (=10 A×110V) power, the standard specifies the PF must be close to 1.0 or 100%. At a power level of 75 W, the standard specifies that the PF must be close to 0.8. However, previously, standard power supply without active power factor correction (PFC) stage can only achieve a 0.5 to 0.6 PF at a power level of 75 W. Therefore, prior art utilizes a double stage AC/DC switching power supply with power factor correction (PFC) to achieve the higher PF with good output power regulation. In a double stage topology, a first stage, which is most commonly a boost stage, takes care of the input current conditioning and energy storage for dealing with the sinusoidal characteristic of the AC (alternating current) outlet, while a second stage, which is an isolated DC/DC converter, takes care of the output voltage regulation. A typical double stage topology is shown in FIG. 1. In FIG. 1, the first stage converts AC input to a loosely regulated 400V intermediate DC bus with power factor correction (PFC). The second stage, a front-end DC/DC converter, will convert 400V DC into a tightly regulated 20V DC bus. The second stage is, in many recent applications, an LLC resonant converter. The double stage solution has several issues, most important being that the power is processed twice via serial/cascade connection of the two stages and that the boost stage has to be able to process twice the average output power on the peak of the input AC line. The resulting designs are therefore complex, expensive and with reduced power density.

Single stage AC/DC topology can be designed to overcome the complexity of the two stage solution, but most single stage topologies fall short of providing all the advantages of the two stage solution. One of the most popular approaches is the single stage PFC (power factor correction) Fly-back, which can provide a good power factor (PF) but has a very poor output voltage regulation (i.e., cannot reject the AC line ripple) and a very poor load transient response. The PFC Fly-back approach can have an improved solution, but the improved solution still lacks the energy storage capability of a two stage topology.

For relatively low power (i.e., 100 W or less), the input current conditioning can be relaxed because the harmonic currents limit can be easier met, the requirements being tailored for 1 kW or more of power from the AC outlet. However, such approaches of single stage PFC AC/DC topologies with storage capability have increased complexity and issues with the control of the storage element voltage.

The symmetrical LLC resonant topology is one of the promising solutions for the DC/DC stage of the two stage converters. Its characteristic frequency control is a trade-off to the soft-switching and low harmonic current content that it provides. However, its main limiting factor is the narrow input voltage range for optimal operation. An alternative approach is to use a constant frequency LLC resonant topology, where the output voltage control is obtain by asymmetric drive of the LLC tank.

Therefore, what is desired is a single stage topology where energy storage is produced in a controlled manner and regulated output voltage is delivered with reasonable well-conditioned input current.

SUMMARY OF THE DESCRIBED EMBODIMENTS

This specification describes various embodiments that relate to a single stage boost-asymmetric LLC topology for an AC/DC power converter. A combined pulse width modulation (PWM) and frequency modulation (FM) is used to achieve dual control for a single main magnetic element (transformer). The transformer provides an output voltage regulation throughout the primary-secondary isolation operating in resonant mode (LLC) by means of frequency modulation, while at the same time its magnetizing inductance is conditioning the input current and providing a boosted high voltage for energy storage purpose by means of duty cycle control. A single pair of complementary primary switches is used to drive the primary winding of the transformer in order to achieve both voltage regulation and power conditioning. The secondary side capacitors and the resonant inductor, which may be either integrated into the transformer or external to the transformer, achieve the resonant function of the transformer.

In one embodiment, a single stage boost-asymmetric LLC AC/DC power switching converter is disclosed. The converter includes a bridge rectifier, which receives an external AC (alternating current) power for conversion into a rectified DC (direct current) power, and a power stage, which receives the rectified DC power for conversion into an output DC power. The power stage includes a high frequency magnetic transformer, a pair of complementary switches, a resonant tank, and a high voltage storage capacitor. The high frequency magnetic transformer includes a primary winding and a secondary winding. The resonant tank includes a resonant inductor and a pair of resonant capacitors. The pair of complementary switches, the resonant inductor, and the high voltage storage capacitor are disposed on the primary winding side of the power stage. The pair of resonant capacitors is disposed on the secondary winding side of the power stage. In one embodiment, the pair of complementary switches includes a first switch and a second switch. The first switch is switched to be opened and closed at a switching frequency with a duty cycle of D. The second switch is switched to be opened and closed at the same switching frequency with a duty cycle of (1-D) so that the second switch is complementary to the first switch (i.e., the second switch is opened when the first switch is closed, and the second switch is closed when the first switch is opened). The duty cycle D cannot be set to 0 or 1. In one embodiment, the converter is operated mostly in an asymmetric mode, where the duty cycle D is not equal to 0.5 when operating in the asymmetric mode. In one embodiment, the resonant inductor, the high voltage storage capacitor, the primary winding, the first switch, and the second switch are connected as shown in FIGS. 2 and 3. In one embodiment, the converter further includes a controller that uses a feedback loop to adjust the duty cycle D and the switching frequency so that an output voltage of the converter is regulated.

In one embodiment, a method for operating a single stage boost-asymmetric LLC AC/DC power switching converter is disclosed. The single stage boost-asymmetric LLC AC/DC power switching converter includes a bridge rectifier, a pair of complementary switches and a single stage LLC transformer. The method includes: (1) processing, with the bridge rectifier, an external AC (alternating current) power into a rectified DC (direct current) power, (2) processing, with the pair of complementary switches, the rectified DC power into an internal DC power associated with a boosted high voltage by switching the pair of complementary switches to be opened and closed at a switching frequency with a duty cycle D, and (3) processing, with the single stage LLC transformer, the internal DC power into an output DC power with power conditioning and voltage regulation. The power conditioning is performed by an inductance of the single stage LLC transformer. The voltage regulation is performed by the single stage LLC transformer by means of frequency modulation operating in resonant mode (LLC). In one embodiment, the pair of complementary switches includes a first switch and a second switch. The first switch is switched to be opened and closed at the switching frequency with a duty cycle of D. The second switch is switched to be opened and closed at the same switching frequency with a duty cycle of (1-D) so that the second switch is opened when the first switch is closed and the second switch is closed when the first switch is opened. The duty cycle D cannot be 0 or 1. In one embodiment, the single stage LLC transformer includes a high frequency magnetic transformer. The high frequency magnetic transformer includes a primary winding and a secondary winding. The resonant mode (LLC) is provided by the primary winding, a resonant inductor, a first resonant capacitor, and a second resonant capacitor. The pair of complementary switches and the resonant inductor are disposed on the primary winding side of the transformer. The first resonant capacitor and the second resonant capacitor are disposed on the secondary winding side of the transformer.

In one embodiment, a single stage boost-asymmetric LLC AC/DC power switching converter is disclosed. The converter includes a bridge rectifier, a high frequency magnetic transformer, a resonant tank, a pair of complementary switches, a high voltage storage capacitor, an input filter capacitor, and an output filter capacitor. The high frequency magnetic transformer includes a primary winding and a secondary winding. The resonant tank includes a resonant inductor, a first resonant capacitor, and a second resonant capacitor. The pair of complementary switches includes a first switch and a second switch. The first switch is switched to be opened and closed at a switching frequency with a duty cycle of D. The second switch is switched to be opened and closed at the same switching frequency with a duty cycle of (1-D) so that the second switch is opened when the first switch is closed and the second switch is closed when the first switch is opened. The duty cycle D cannot be 0 or 1. The various components of the single stage boost-asymmetric LLC AC/DC power switching converter are connected as shown in FIGS. 2 and 3. For example, the bridge rectifier includes a first, a second, a third, and a fourth terminal. The first and the second terminals are connected to an external AC (alternating current) power source, as shown in FIG. 3. The third terminal of the bridge rectifier is connected to the first terminal of the primary winding and the first terminal of the input filter capacitor. The fourth terminal of the bridge rectifier is connected to the second terminal of the input filter capacitor and the second terminal of the first switch.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6A illustrates the input to the bridge rectifier, which is a sinusoidal AC power. FIG. 6B illustrates the rectified DC power output from the bridge rectifier, where D is allowed to be equal to 1. FIG. 6C illustrates the rectified DC power output from the bridge rectifier, where D is not allowed to be equal to 1.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
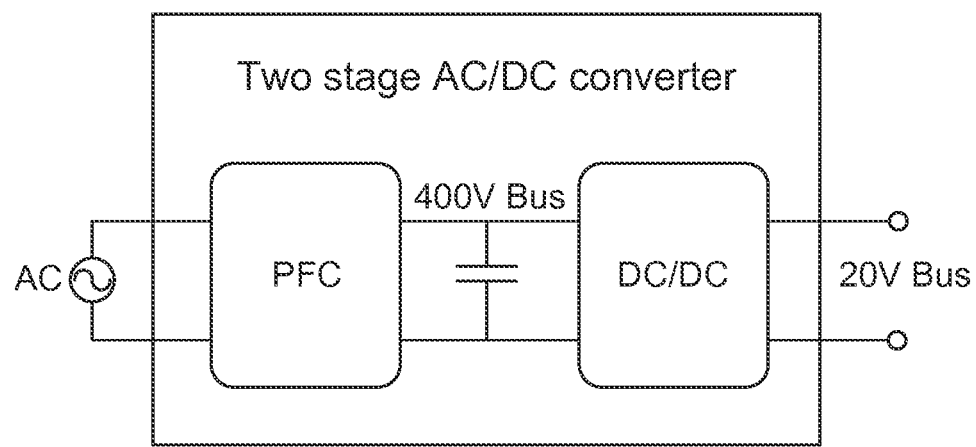
FIG. 1 illustrates a typical two stage AC/DC converter that is prior art.

The present application discloses a single stage AC/DC power converter that can simultaneously perform both line conditioning and output regulation. The single stage topology is possible because only a 0.8 PF, and not a perfect 1.0 PF, is required at a power level of 75 W. The operation of the single stage topology can be understood by comparing it to the two stage topology. In the classical two stage topology, as shown in FIG. 1, the PFC first stage is typically a boost converter, while the DC/DC second stage is an LLC converter. In one embodiment of a single stage converter, the present application discloses using one magnetic element to perform both a boost function of the PFC first stage and a relatively good efficient conversion function of the LLC DC/DC second stage.

In the classical two stage topology, the PFC first stage includes an inductor that is used as a choke, while the LLC DC/DC second stage includes a magnetic element that is used as a primary winding of a transformer. In one embodiment of a single stage converter, the primary winding of the transformer in the LLC DC/DC second stage can be used to replace the choke in the PFC first stage. Then, with some further minor component changes, the entire PFC first stage of the classical two stage topology can be removed, so that only a single stage remains. This is because the single stage remaining can concurrently perform both the function of the PFC first stage and the LLC DC/DC second stage. The minor component changes that need to be carried out include moving two resonant capacitors to the secondary winding side of the converter and adding a resonant inductor to the primary winding side of the converter. Even though these components of the resonant tank are now split between the primary and the secondary winding sides of the transformer, the voltage and current of the primary winding and secondary winding are actually linked together during the conduction of the transformer. From a high frequency point of view, the transformer behaves like a short. Therefore, the two resonant capacitors can be seen on the primary side and the resonant inductor can be seen on the secondary side. This allows the resonant capacitors to resonate with the resonant inductor. The resulting configuration is called a single stage boost LLC resonant topology. Because operation of this topology is preferred to be in the asymmetric mode, this topology is also called a single stage boost-asymmetric LLC resonant topology.

Figure 2:
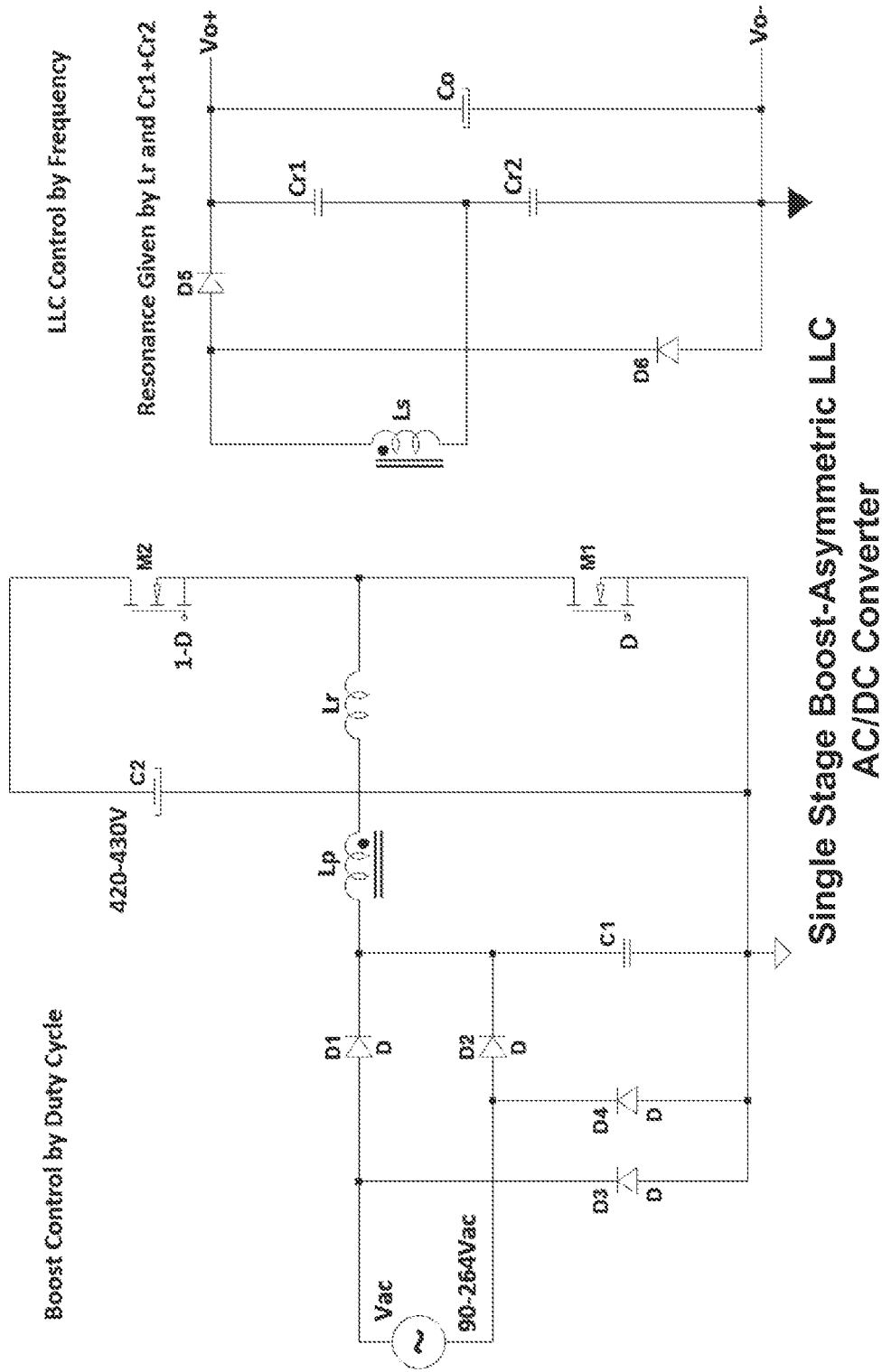
FIG. 2 illustrates a preferred embodiment of a single stage boost-asymmetric LLC AC/DC power switching converter.

FIG. 2 presents a preferred embodiment of the single stage boost-asymmetric LLC resonant topology. The external universal AC power source Vac (for example 90-264V, 47-63 Hz) is connected to a bridge rectifier, which includes diodes D1, D2, D3, and D4. The bridge rectifier provides rectified DC voltage to a power stage formed by the following elements: (1) a high frequency magnetic transformer, which includes one primary winding Lp and one secondary winding Ls, (2) a pair of complementary switches M1 and M2, (3) a pair of secondary rectifiers D5 and D6, (4) a resonant tank formed by inductor Lr and capacitors Cr1 and Cr2, (5) an input filter capacitor C1, (6) a high voltage storage capacitor C2, and (7) an output filter capacitor Co.

Figure 3:
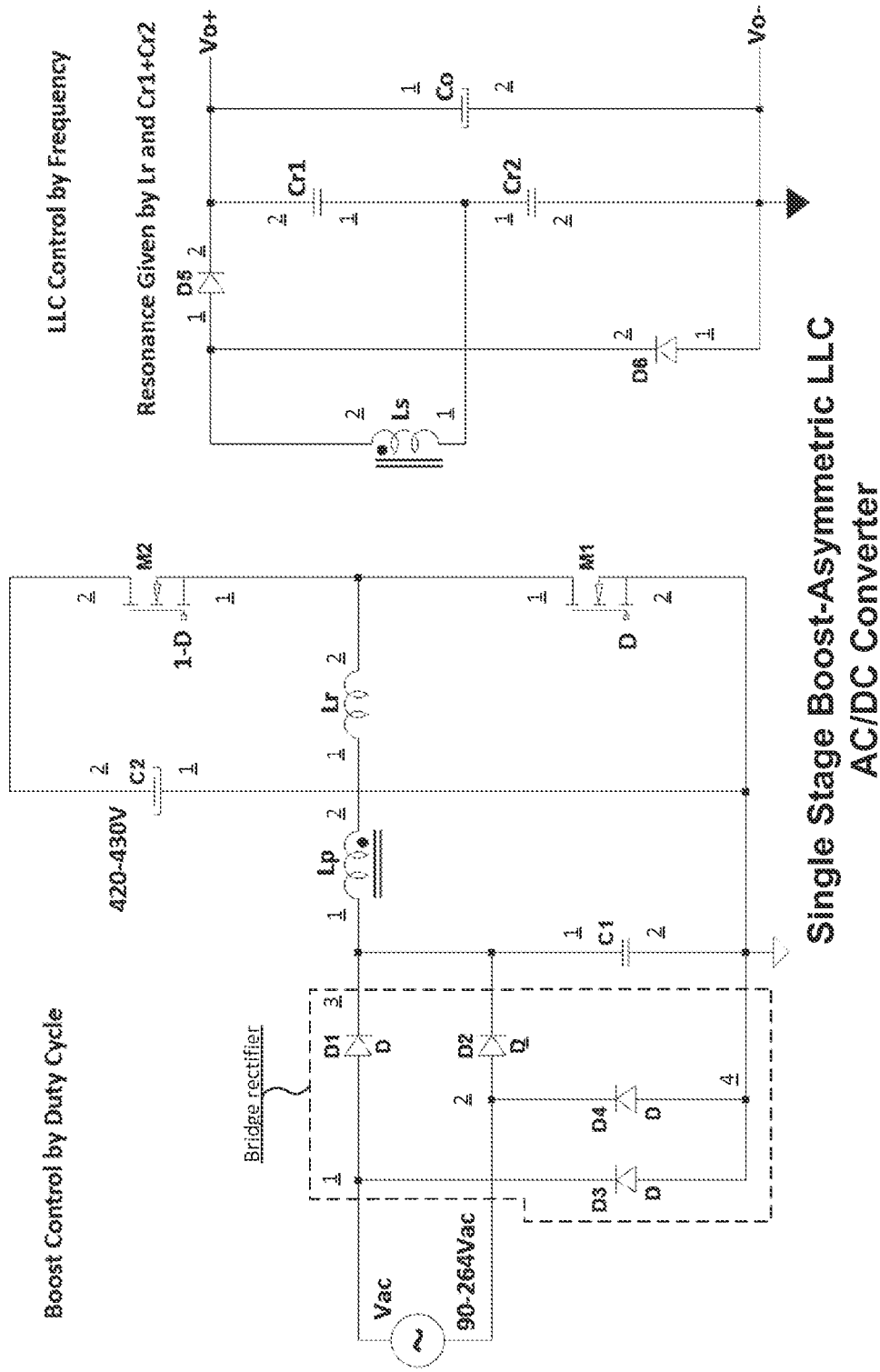
FIG. 3 illustrates the preferred embodiment of a single stage boost-asymmetric LLC AC/DC power switching converter from FIG. 2 with the terminals of various components labeled.

FIG. 3 presents the preferred embodiment of the single stage boost-asymmetric LLC resonant topology from FIG. 2 with the terminals of various components labeled. For example, the bridge rectifier has four terminals, labeled as a first, a second, a third, and a fourth terminal. In FIG. 3, these four terminals are denoted by underlined numbers (i.e., 1, 2, 3, and 4). It can be seen that the first and second terminals of the bridge rectifier are connected to an external AC (alternating current) power source. As another example, the high frequency magnetic transformer includes a primary winding Lp and a secondary winding Ls. The primary winding Lp has a first and a second terminal. The first terminal of the primary winding Lp is connected to the third terminal of the bridge rectifier. The second terminal of the primary winding Lp is connected to the first terminal of the resonant inductor Lr.

In one embodiment, the resonant inductor Lr is an independent inductor. In another embodiment, the resonant inductor Lr is derived from the leakage inductance of the transformer (i.e., an inductance that is integrated into the transformer). In one embodiment, the pair of complementary switches M1 and M2 can be high frequency MOSFET (metal-oxide-semiconductor field-effect transistor) switches.

Figure 4:
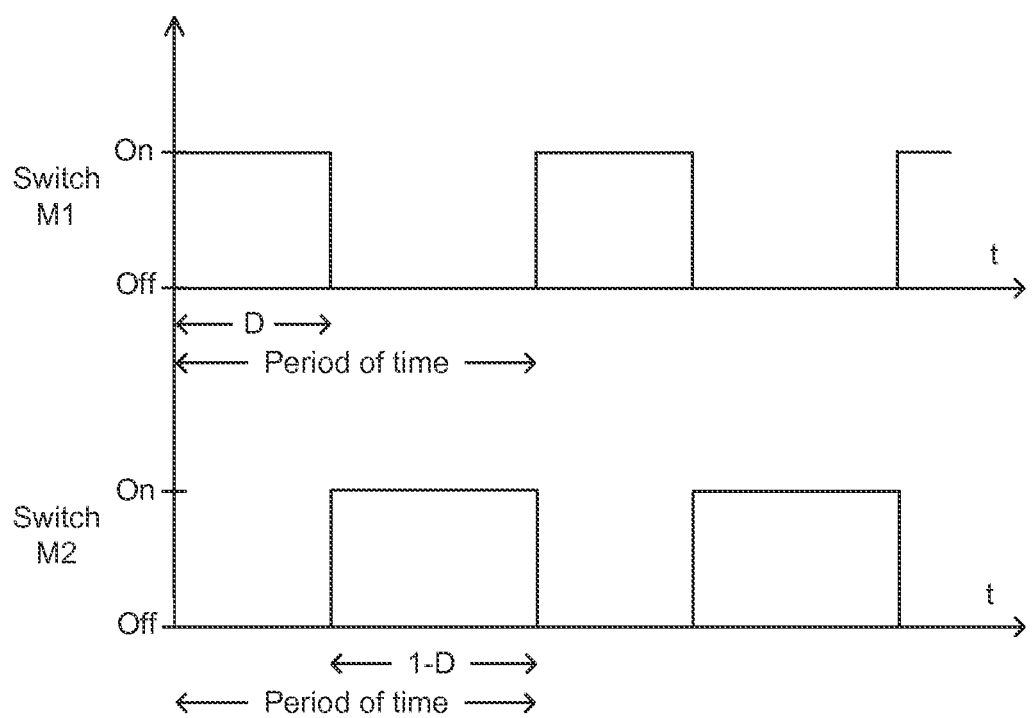
FIG. 4 illustrates the duty cycles of a pair of complementary switches M1 and M2 (i.e., duty cycle D for M1 and its complement duty cycle (1-D) for M2).

Pulse width modulation (PWM) is achieved by switching both switches M1 and M2 on and off at a same switching frequency F. Duty cycle defines the fraction of switch 'on' time to the 'period' of time or regular interval corresponding to the switching frequency F. This is shown in FIG. 4. The duty cycle of switch M1 is D, so switch M1 is turned on (i.e., switch "closed") for a D fraction of time during the 'period' of time corresponding to the switching frequency F. The duty cycle of switch M2 is (1-D), so switch M2 is turned on (i.e., switch "closed") for a (1-D) fraction of time. Switches M1 and M2 are complementary, because one of the switch is turned on (i.e., switch "closed") when the other switch is turned off (i.e., switch "opened"). Therefore, switch M1 and M2 alternate being on and off (i.e., switch "closed" and "opened"), and the sum of their duty cycles equals 1.

Figure 5:
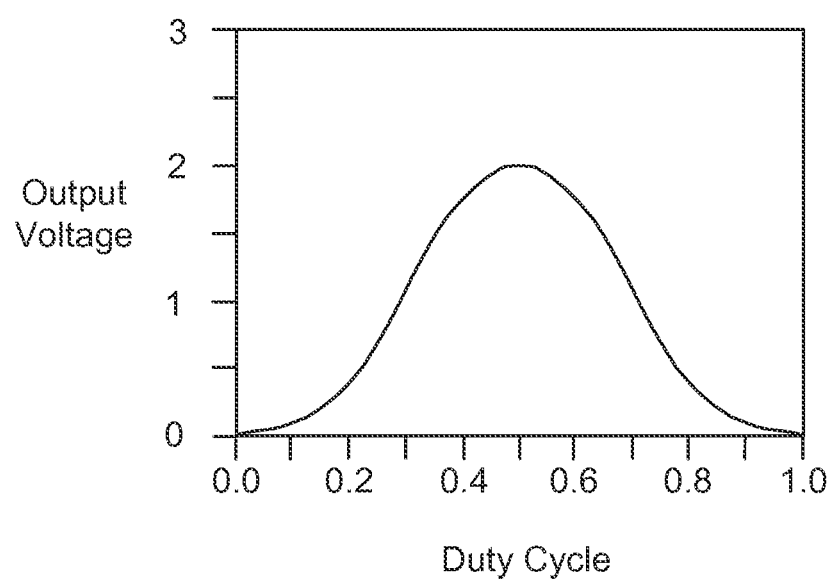
FIG. 5 illustrates a graph showing the change in output voltage as a function of duty cycle for an embodiment of a single stage boost-asymmetric LLC converter.

The operation of the single stage boost-asymmetric LLC topology is obtained by controlling both the switching frequency F, and the duty cycle D of switch M1 and its complement (1-D) of switch M2. (Note: The single stage topology has only one switching frequency F and one duty cycle D, which is different from the classical two stage topology where there can be two sets of switching frequency and duty cycle, a first set for the PFC first stage and a second set for DC/DC second stage.) The duty cycle control allows the voltage regulation (except for the AC line ripple) of the high voltage storage capacitor C2 during a semi-cycle of the Vac power supply. The output voltage, which is equal to Vo+ minus Vo−, can be changed by varying either the switching frequency F or the duty cycle D or both parameters. FIG. 5 illustrates a graph showing the change in output voltage as a function of duty cycle for an embodiment of a single stage boost-asymmetric LLC converter. The single stage boost LLC converter can be operated in both the symmetric and asymmetric mode. In the symmetric mode, the duty cycle D is equal to 0.5. In the asymmetric mode, the duty cycle D is not equal to 0.5. In one embodiment, it can be shown that the single stage boost LLC converter can achieve a higher efficiency by operating in the asymmetric mode. In one embodiment, the single stage boost LLC converter can be configured to operate mostly in an asymmetric mode. Duty cycle control together with frequency control of the asymmetric LLC resonance allows a good regulation of the output voltage across Co.

The number of turns of primary winding Lp (Np) and the number of turns of secondary winding Ls (Ns) of the transformer generate the transformer turn ratio Nr and help to define the main resonance frequency (Fr) of the LLC as:

$$Fr = \frac{1}{2\pi\sqrt{Lr\frac{Cr1+Cr2}{Nr^2}}}$$

where $Nr = Np/Ns$

Therefore, a given resonant frequency can be established for a single stage converter by selecting the appropriate resonant tank components (i.e., Lr, Cr1, and Cr2). Maximum gain can be achieved by operating at the resonant frequency. However, the above equation for the main resonance frequency Fr is only valid for operation in the symmetric mode, when duty cycle is equal to 0.5. If the single stage boost LLC converter operates in the asymmetric mode, then the duty cycle is not equal to 0.5 and the gain of the LLC decreases. This can be seen in FIG. 5, where a drop in gain (or output voltage) can be seen when the duty cycle deviates from 0.5.

In order to assure an uninterrupted power delivery to the output by the LLC tank, the duty cycle D cannot be set to be equal to 0 or 1. When D equals to 0 or 1, there is no switching and power delivery to the output is interrupted. Therefore, a minimum duty cycle value Dmin and a maximum duty cycle value Dmax must be defined for the control scheme:

$$0<Dmin<D<Dmax<1$$

Figure 6A:
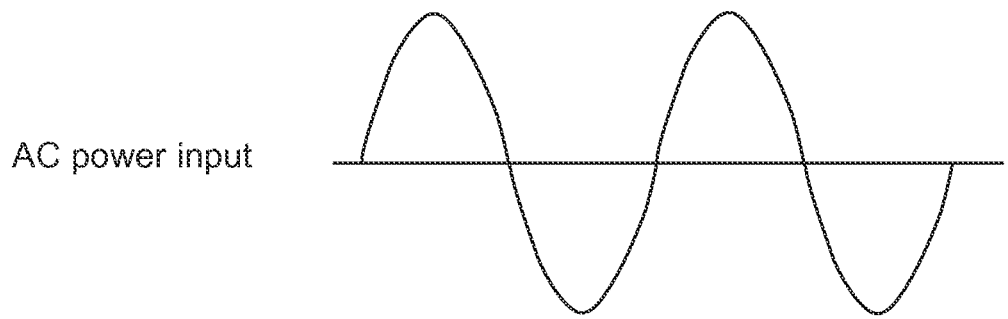
FIGS. 6A to 6C illustrate the input and the output power of the bridge rectifier.
Figure 6B:
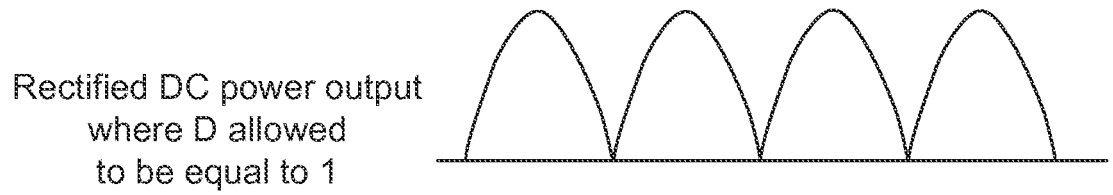
Figure 6C:
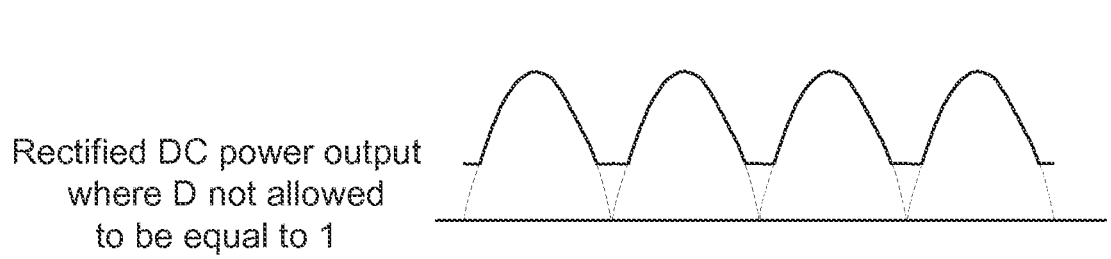

In one embodiment, Dmax can be set to be equal to 0.8 and Dmin can be set to be equal to 0.2. This duty cycle limitation reduces the input current conditioning capability of the single stage boost-asymmetric LLC converter, since a perfect PF of 1.0 can only be theoretically achieved when duty cycle D equals to 1. The output voltage of the bridge rectifier can drop to zero when the duty cycle is allowed to be equal to 1. This is the situation shown in FIGS. 6A and 6B. FIG. 6A shows that the input to the bridge rectifier is a sinusoidal AC power. FIG. 6B shows that, if the duty cycle D is allowed to be equal to 1, the output voltage of the bridge rectifier can drop to zero. However, the duty cycle D cannot be allowed to be equal to 1, because, when D equals 1, there is no switching and power delivery to the output is interrupted. This is the situation shown in FIGS. 6A and 6C. Again, FIG. 6A shows that the input to the bridge rectifier is a sinusoidal AC power. However, since the duty cycle D is not allowed to be equal to 1, FIG. 6C shows that the output voltage of the bridge rectifier will never drop to zero.

An advantage of the single stage boost-asymmetric LLC converter shown in FIG. 2 is that the peak boosting requirement of Lp is limited to only average output power (half of that of the classical boost stage), because the power is only processed once. Processing the power only once allows the single stage boost-asymmetric LLC converter to be more efficient. The transformer continuously delivers 100% of the output power, while the difference between the output power and the input power is stored in the high voltage storage capacitor C2 when the input power is in excess, or is provided by the high voltage storage capacitor C2 when the input power is insufficient, depending on the Vac phase. Depending on the supply phase, the LLC transformer delivers the output power only from the Vac supply, only from C2, or from both Vac and C2.

Figure 7:
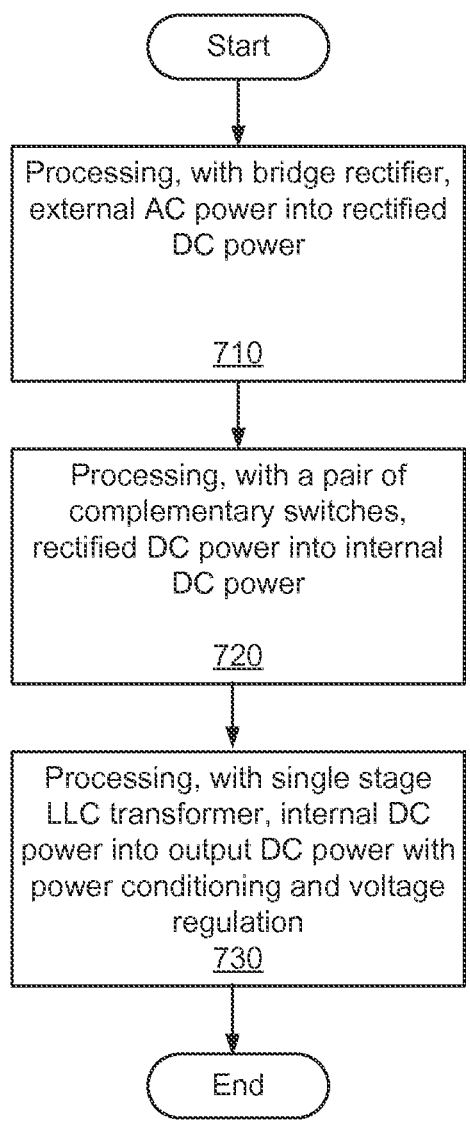
FIG. 7 illustrates a flow chart showing method steps for operating a single stage boost-asymmetric LLC AC/DC converter.

FIG. 7 illustrates a flow chart showing method steps for operating a single stage boost-asymmetric LLC AC/DC converter. In one embodiment, a method for operating a single stage boost-asymmetric LLC AC/DC converter starts with step 710, which processes, with a bridge rectifier, an external AC power into a rectified DC power. The method continues in step 720 by processing, with a pair of complementary switches, the rectified DC power into an internal DC power. In step 730, the method processes, with a single stage LLC transformer, the internal DC power into an output DC power with power conditioning and voltage regulation.

Figure 8:
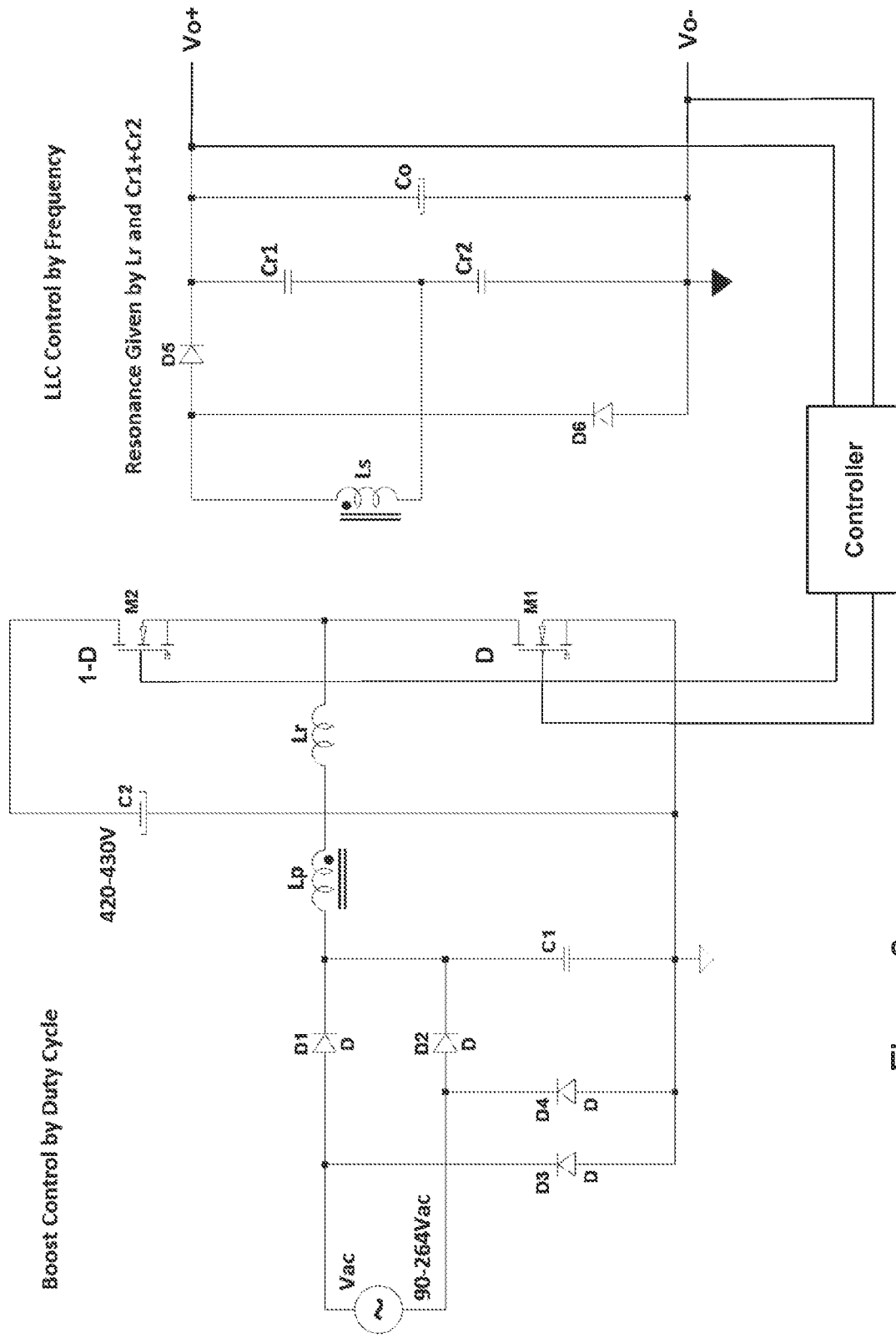
FIG. 8 illustrates an embodiment of a single stage boost-asymmetric LLC AC/DC power switching converter using a controller to control output voltage with duty cycles and switching frequency of the complementary switches M1 and M2.

FIG. 8 illustrates an embodiment of a single stage boost-asymmetric LLC AC/DC power switching converter using a controller to control output voltage with the duty cycles and the switching frequency of the complementary switches M1 and M2. The controller can monitor the output voltage of the single stage converter, which is equal to Vo+ minus Vo−. The switching frequency of the complementary switches M1 and M2 is very fast. In one embodiment, the switching frequency can be 20 kHz. In another embodiment, it can be even as high as 100 kHz. The control loop to control the duty cycle is very slow. It is used to control the PFC function occurring on the primary winding Lp side of the converter by adjusting the duty cycle. The main purpose of the PFC function is to simulate the resistive load that can provide a perfect PF of 1.0. Therefore, the PFC loop control frequency must be very slow relative to the input AC line frequency so that the input AC line sees a constant resistive load. Typically, the AC line is at 50 to 60 Hz. If this AC line input is rectified by a bridge rectifier, then the frequency is doubled up to 100 to 120 Hz, as shown in FIGS. 6A to 6C. As such, the loop control frequency must be much less than 100 Hz. In one embodiment, the control loop frequency to control the PFC function by adjusting the duty cycle is fixed at 10 Hz. In another embodiment, the control loop frequency can be from 10 to 20 Hz. By adjusting the duty cycle D, the PFC function control loop controls the boosted high voltage on the primary winding Lp side of the converter. Since the PFC function control loop is very slow (i.e., 10 Hz), this boosted high voltage can be considered to be quasi-constant. As this quasi-constant high voltage is changed via adjustments in the duty cycle, the gain of the LLC has also to be changed accordingly in order to regulate the output voltage. Typically, as the duty cycle is changed to perform the boost function, the gain will drop. To compensate for this drop in gain, the switching frequency seen by the LLC will have to be reduced. This increases the gain so that the gain returns to the same value that is needed to deliver the regulated output voltage. In summary, the controller has a slow moving PFC loop control to adjust the duty cycle. As the duty cycle is adjusted, changing the gain, the controller can automatically calculate the change in frequency that is needed to return the gain back to the old value required for delivering the regulated output voltage (i.e., Vo+ minus Vo−). The feedback control loop for monitoring the output voltage is much faster than the control loop for adjusting the duty cycle. In one embodiment, the output voltage feedback loop can operate at 1 to 2 kHz. In another embodiment, it can operate at 1 kHz. The fast feedback loop allows for tight regulation of the output voltage, since any changes in the output voltage will be quickly corrected by a compensating change in the switching frequency. It is important to note that the switching frequency (e.g., 20 kHz) is much faster than the PFC loop control (duty cycle adjustment ~10 Hz) and the LLC loop control (switching frequency adjustment ~1 kHz).

The above mentioned control scheme can be achieved by those skilled in the art of switching power supply design by means of analog control, digital control or a combination of the two.

Figure 9:
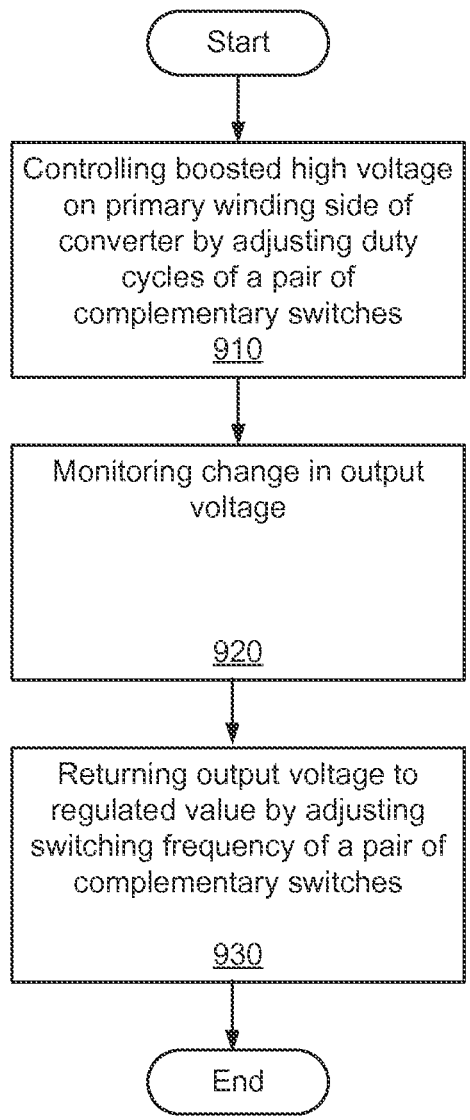
FIG. 9 illustrates a flow chart showing method steps for controlling output voltage with duty cycles and switching frequency of a pair of complementary switches.

FIG. 9 illustrates a flow chart showing method steps for controlling output voltage with duty cycles and switching frequency of a pair of complementary switches. In one embodiment, a method for controlling output voltage with duty cycles and switching frequency of a pair of complementary switches starts with step 910, which controls a boosted high voltage on a primary winding side of a converter by adjusting duty cycles of a pair of complementary switches. The method continues in step 920 by monitoring change in the output voltage. In step 930, the method returns the output voltage to a regulated value by adjusting the switching frequency of the pair of complementary switches.

In one embodiment, the single stage boost-asymmetric LLC converter can have a PF of 0.85 to 0.9 at a power level of 75 W to 100 W. In one embodiment, the single stage boost-asymmetric LLC converter can have a 93% to 94% efficiency, which is 2% better than a prior art two stage converter at the same power level. Furthermore, being single stage, the disclosed single stage boost-asymmetric LLC converter has the advantages of being smaller and simpler. Having fewer components also means that it is cheaper.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A power converter comprising:
   a full bridge rectifier configured to receive an alternating current (AC) input for conversion into a rectified direct current (DC) output;
   a transformer comprising a primary winding and a secondary winding, wherein a first primary terminal of the primary winding is connected to the full bridge rectifier;
   a resonant inductor connected to a second primary terminal of the primary winding;
   a storage capacitor and a pair of parallel switches that are disposed on a primary winding side of the transformer such that a current from the full bridge rectifier flows through the primary winding, then the resonant inductor, before flowing through the pair of parallel switches;
   a pair of diodes connected to a first secondary terminal of the secondary winding; and
   a pair of resonant capacitors connected to a second secondary terminal of the secondary winding.

2. The power converter of claim 1,
   wherein the pair of parallel switches is comprised of a first switch and a second switch that is connected in parallel to the first switch.

3. The power converter of claim 2, wherein the storage capacitor is connected in series with the first switch.

4. The power converter of claim 3, further comprising:
   output terminals on a secondary winding side of the transformer; and
   a controller connected to the pair of parallel switches and the output terminals.

5. The power converter of claim 4, wherein the controller is configured to adjust a duty cycle of the pair of parallel switches and regulate an output voltage at the output terminals of the power converter.

6. The power converter of claim 5, wherein a boosted voltage of the primary winding is controlled by adjusting the duty cycle, and a gain on the secondary winding is controlled by adjusting a switching frequency of the pair of parallel switches.

7. The power converter of claim 5, wherein the pair of resonant capacitors are connected in parallel to the output terminals on the secondary winding side of the transformer.

8. The power converter of claim 1, wherein an inductance value of the resonant inductor is based on a leakage inductance of the transformer.

9. The power converter of claim 1, wherein the pair of parallel switches is comprised of high frequency metal oxide semiconductor field-effect transistor (MOSFET) switches.

10. The power converter of claim 1, further comprising:
    an input filter capacitor, and
    an output filter capacitor,
       wherein the input filter capacitor is disposed on the primary winding, and
       the output filter capacitor is disposed on the secondary winding.

11. A method for operating a power converter that includes a full bridge rectifier, a pair of parallel switches, and a transformer, the method comprising:
    converting, using the full bridge rectifier, an external alternating current (AC) power into a rectified direct current (DC) power;
    converting, using the pair of parallel switches, the rectified DC power into an internal DC power by switching the pair of parallel switches; and
    converting the internal DC power into an output DC power using power conditioning and voltage regulation,
       wherein the power conditioning is performed by an inductance of the transformer and a resonant inductor that is connected to a primary side of the transformer such that a current from the full bridge rectifier flows through a primary winding of the transformer, then the resonant inductor, before flowing through the pair of parallel switches, and
       wherein the voltage regulation is performed by resonant capacitors on a secondary winding side of the transformer, the resonant capacitors configured to resonate with the resonant inductor.

12. The method of claim 11,
    wherein the pair of parallel switches comprises a first switch and a second switch that is connected in parallel to the first switch.

13. The method of claim 12,
    wherein a resonant mode of the power converter is provided by the primary winding, the resonant inductor, and the resonant capacitors.

14. The method of claim 13, wherein the power converter is operated in an asymmetric mode and a duty cycle of the pair of parallel switches is not equal to 0.5 when operating in the asymmetric mode.

15. The method of claim 14, wherein converting the rectified DC power into the internal DC power and converting the internal DC power into the output DC power comprise:
    using a feedback loop, with a controller, to adjust the duty cycle and a switching frequency of the pair of parallel switches so that the output DC power is voltage regulated.

16. The method of claim 15, wherein the internal DC power is controlled by adjusting the duty cycle and a gain on the secondary winding side of the transformer is controlled by adjusting the switching frequency.

17. A power converter comprising:
    a full bridge rectifier configured to convert an alternating current (AC) input to a direct current (DC) output, and provide the DC output to a primary side of a transformer of the power converter; and
    a resonant tank comprising (i) a resonant inductor connected to the primary side of the transformer and (ii) resonant capacitors connected on a secondary side of the transformer, wherein the resonant capacitors resonate with the resonant inductor in response to a switching operation of parallel switches connected at the primary side of the transformer such that a current from the full bridge rectifier flows through a primary winding of the transformer, then the resonant inductor, before flowing through the parallel switches.

18. The converter of claim 17, wherein the resonant inductor is connected in series with the primary side of the transformer and the parallel switches include at least two switches that are connected in parallel relative to each other.

19. The converter of claim 17, wherein the resonant tank further comprises:
a storage capacitor connected in series with a switch of the parallel switches.

20. The converter of claim 17, wherein the parallel switches operate according to a switching frequency that causes the resonant capacitors to resonate.

* * * * *